United States Patent [19]

McCallum

[11] 4,142,959
[45] Mar. 6, 1979

[54] ELECTRODE ASSEMBLY

[75] Inventor: John McCallum, Worthington, Ohio

[73] Assignee: Electro-Chlor Corporation, Worthington, Ohio

[21] Appl. No.: 871,926

[22] Filed: Jan. 24, 1978

Related U.S. Application Data

[63] Continuation-in-part of Ser. No. 525,882, Nov. 21, 1974, Pat. No. 4,085,028.

[51] Int. Cl.² .......................... C25B 1/16; C25B 1/26; C02B 1/82
[52] U.S. Cl. .................................. 204/286; 204/255; 204/268; 204/269
[58] Field of Search ............... 204/149, 152, 255, 253, 204/269, 275, 286

[56] References Cited

U.S. PATENT DOCUMENTS

| | | | |
|---|---|---|---|
| 3,402,117 | 9/1968 | Evans | 204/286 X |
| 3,425,929 | 2/1969 | Emery et al. | 204/286 X |
| 3,477,939 | 11/1969 | Kircher | 204/286 X |
| 3,642,604 | 2/1972 | Giacopelli | 204/286 |
| 3,819,504 | 6/1974 | Bennett | 204/149 X |
| 3,835,020 | 9/1974 | Galneder | 204/149 X |

*Primary Examiner*—Arthur C. Prescott
*Attorney, Agent, or Firm*—Van D. Harrison, Jr.

[57] ABSTRACT

An improved assembly of bipolar electrode elements for use in the electrochemical preparation of hypochlorites or chlorine from dilute water solutions of chlorides, particularly mildly saline swimming pool water, is described. The end of each bipolar electrode element is enclosed in a nonconductive plastic strip, and guard baffles of corresponding thickness and height are inserted on each side of the bipolar electrode. A desired number of these elements are grouped and cemented together by solvent welding. Special adhesives enhance the sealing of the bipolar electrodes. With this electrode assembly, the deposition of mineral deposits on the electrode surfaces can be minimized by reversing the flow of direct current as often as twice a day or as seldom as once every two weeks.

10 Claims, 10 Drawing Figures

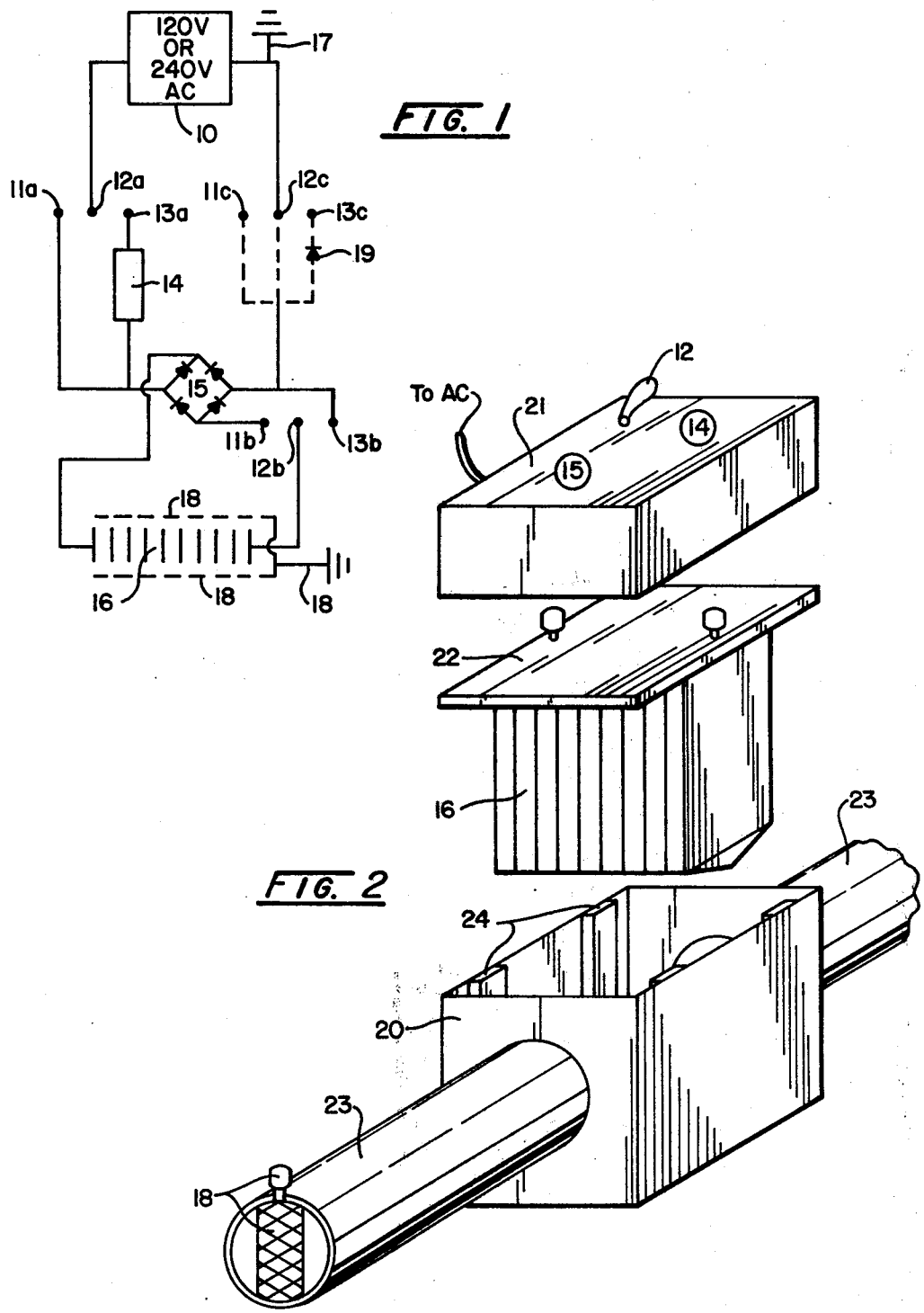

ELECTRODE ASSEMBLY

REFERENCES TO RELATED APPLICATIONS

This application is a continuation-in-part of my copending application, Ser. No. 525,882, filed Nov. 21, 1974 U.S. Pat. No. 4,085,028.

NATURE OF THE INVENTION

This invention relates to an improved structure for bipolar electrode assemblies useful in the preparation of hypochlorites and chlorine from dilute solutions of chlorides (sodium chloride, for example). This invention more particularly relates to electrode assemblies for use in swimming pool water treating systems.

BACKGROUND OF THE INVENTION

In my copending application, I describe an electrolysis cell having particular utility as a means for generating hypochlorites and chlorine in swimming pool waters circulated through the cell. The waters contain a low concentration of a chloride salt such as sodium chloride. My application Ser. No. 525,882 is hereby incorporated by reference into this disclosure. In the accompanying drawings, FIGS. 1, 2, 3, and 4 depict the apparatus of my copending application.

As described in my copending application, a combination of steel negative electrode faces and rapid velocities was discovered to be adequate to avoid the accumulation of hardness deposits on the steel negative electrode faces. Moreover, as described in my copending application, baffles, or shields, 40 (FIG. 4a) were found necessary. It was determined that these baffles should extend parallel to the flow path of said liquid and for a distance on either side of each bipolar electrode face 38 or 39 (FIG. 3a) equal to at least 10 times the distance between opposing faces of adjacent electrodes. To accomplish this important but difficult arrangement, I disclose the filling of slots 37a and 37b with inner and outer conducting clips 42 and 43 respectively and that the resulting joints could be sealed by caps 44 with sealing cement 45. Examples I and II of my original application show how this structure worked 34 and 64 days, respectively, with no visible indications of problems at these joints. However, the required perfection of these joints was found difficult to retain with the further production of large numbers of cell assemblies. Joints which appeared to be perfect initially, subsequently would reveal a weak point or imperfection. At these points of imperfection, which were perhaps only a microscopic opening at the start, anodic corrosion of the conduction clip 42 and/or 44 would begin. As attack at these points continued, small areas of high resistance formed and tended to reduce the current going through all bipolar electrodes in series. The voltage drops existing at these imperfections increased and accelerated the deterioration of the imperfect joint. Towards the end of this process, nearly all of the rectified 120 ac line voltage might appear across just one or two joints. An electrical arcing, or scintillations, could be observed as current dropped toward zero and the cell assembly failed. Subsequent examination would show only one or a few electrodes to be bad. All other electrodes and joints would appear still to be in perfect condition.

Continued experience with the apparatus of my copending application revealed new and unexpected problems. One problem appeared where the tab from extreme positive electrode 30 and extreme negative electrode 31 come through cover 22. In my original specification, I disclose the use of "soft sealants," "bathtub sealants," and "silicone sealants." These common sealing materials were subsequently found not to be completely satisfactory because they tended to leak after an extended time of use. The metal electrodes and surrounding plastic expand and contract at different rates, thereby causing a leak over a period of time during which ambient or water temperatures varied. The physical insertion and removal of connectors to the tabs on electrodes 30 and 31 sometimes also helped to create small leaks by the physical flexing of these critical joints. Solvent cements are too brittle. Thick pastes and putties are too bulky for the precision of assembly needed and would not always adhere to the metal. Consultation with sales representatives from companies making sealants quickly showed there was no obvious answer to this problem with terminal electrodes. Numbers of sealants were suggested for trial and were subsequently tested for this invention.

Another problem appeared where the unshielded bottoms of terminal electrodes 30 and 31 sometimes became exposed to electrolyte. Because those bottome edges of these electrodes were cut and uncoated, corrosive attack began to eat away at the bottom of the terminal electrodes. The mere painting of bottom joints between terminal electrodes and bipolar electrodes was not satisfactory.

Another problem appeared which is known to the prior art of electrolysis of sea water and other dilute or concentrated brines. It is well known that hardness deposits will build up on most negative electrode surfaces. Those working in the art have reported these hardness deposits can easily be removed by periodically reversing the direction of current flow. This current reversal technique seems to work satisfactorily with carbon electrodes but when hydrogen is cathodically evolved on titanium, or evolved on porous coatings on titanium, some of the hydrogen tends to enter the titanium metal lattice forming titanium hydride. Titanium hydride is brittle and its lattice is about 13 percent expanded beyond that of the titanium lattice. When the current is reversed back to its original anodic direction, this titanium hydride surface is oxidized, which further deteriorates the titanium structure and tends to remove the conductive coatings which were so carefully placed there to permit the use of coated titanium as positive electrodes in the first place. These hydriding and oxidizing effects with coated titanium electrodes were so well established and well known that, when I approached the major producers of coated titanium electrodes for their recommendation on materials to be used in my electrode assembly, I was told no known electrodes would withstand current reversals under the conditions planned and desired for the utilization of my invention. One supplier said he had seen coated titanium electrodes become brittle and start to lose their coating in as short a time as one-half hour. Another said I could expect to see hydrides and surface deterioration within 24 hours. Another supplier of coated titanium electrodes said there was no way to tell whether his electrodes would withstand current reversals under the conditions I proposed. Thus, some experts in the art of electrolyzing hard brines reported that I should get rid of hardness deposits on coated titanium electrodes by some other way than by current reversals. Other experts were not sure as to how to eliminate hardness deposits.

OBJECTS OF THE INVENTION

An object of this invention is to improve the interconnection of bipolar electrodes for the production of more concentrated hypochlorite solutions in apparatus similar to that shown in my copending application in which the solution passes all electrodes in series. Another object is to improve the interconnection between the many parallel electrodes shown in the electrode assembly of my copending application for the chlorinating of swimming pool water and other large volumes of circulating waters where hardness is almost certain to be encountered and where the solution passes each electrode in parallel. Another object is to devise a permanent seal for the bottoms of extreme positive and negative electrodes in the electrode assembly. Another object is to provide an electrode assembly wherein coated titanium electrodes could be subjected to reversal of current for the removal of hardness deposits on negative electrode surfaces without damage to the underlying titanium structure.

SUMMARY OF THE INVENTION

Briefly stated my invention comprises an electrode assembly made up of a number of bipolar electrode elements. Each bipolar element comprises an electrode with a positive face and a negative face with a baffle or shield extending essentially coplanearily on each side of the exposed positive and negative electrode surfaces. The electrode and baffle are mounted along their top and bottom edges in a grooved length of non-conductive material of suitable dimensions to support the individual electrode and shield. A number of these electrodes are then grouped so that the negative face of one electrode is positioned opposite and parallel to the positive face of the adjacent electrode at a predetermined spacing. The electrode elements are then affixed to each other along the top and bottom grooved sections. Positive and negative end electrodes are then fixed at corresponding ends of the assembly and a bottom strip of nonconductive material is cemented along the bottom of the assembly.

DESCRIPTION OF THE DRAWINGS

FIG. 1 is an diagram showing the use of the electrode assembly of my copending application for which assembly the electrode assembly of this invention can be substituted.

FIG. 2 is an exploded view of the device of my copending application indicating generally at 16 the electrode assembly which is the subject of this disclosure.

FIG. 4a is the front view of an individual bipolar electrode structure according to my copending application.

FIG. 4b is a cross-sectional view of an individual bipolar electrode structure at a—a in FIG. 4a.

FIG. 4c is a top phantom view of an individual bipolar electrode structure.

DETAILED DESCRIPTION OF THE INVENTION

Figure 3:
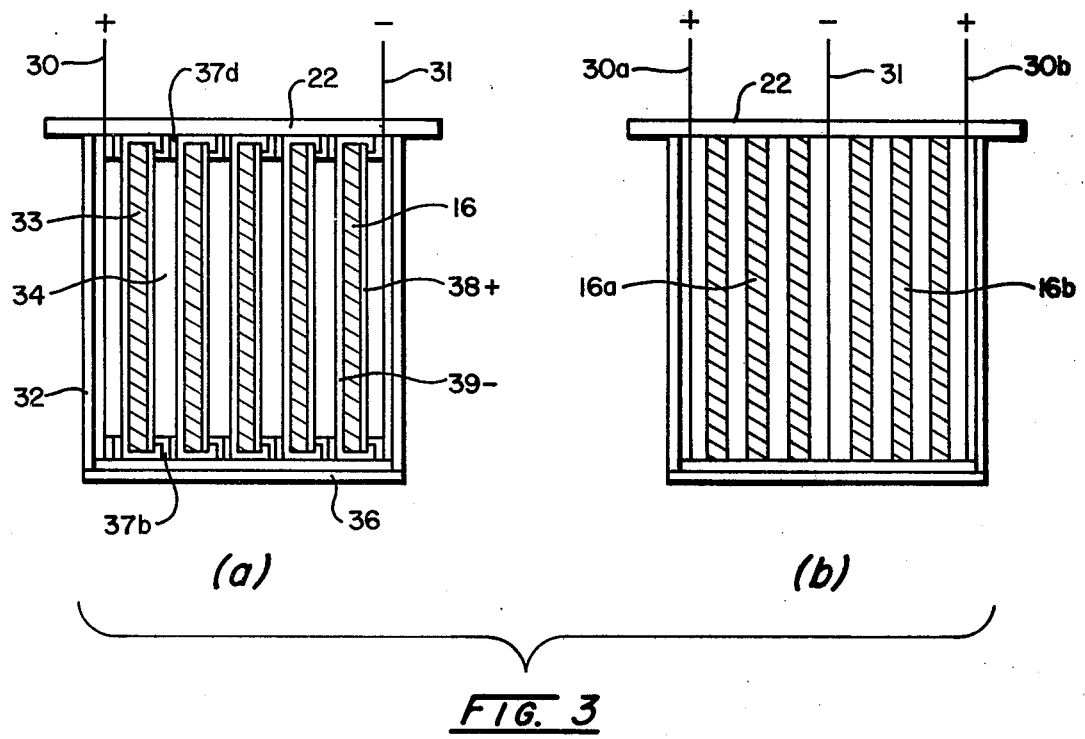
FIG. 3a is a front view of removable cover 22 with attached electrode assembly 16 of my copending application and other attached parts.
FIG. 3b is an end view of a double electrode assembly of my copending application for attachment to the same voltage source.
Figure 4:
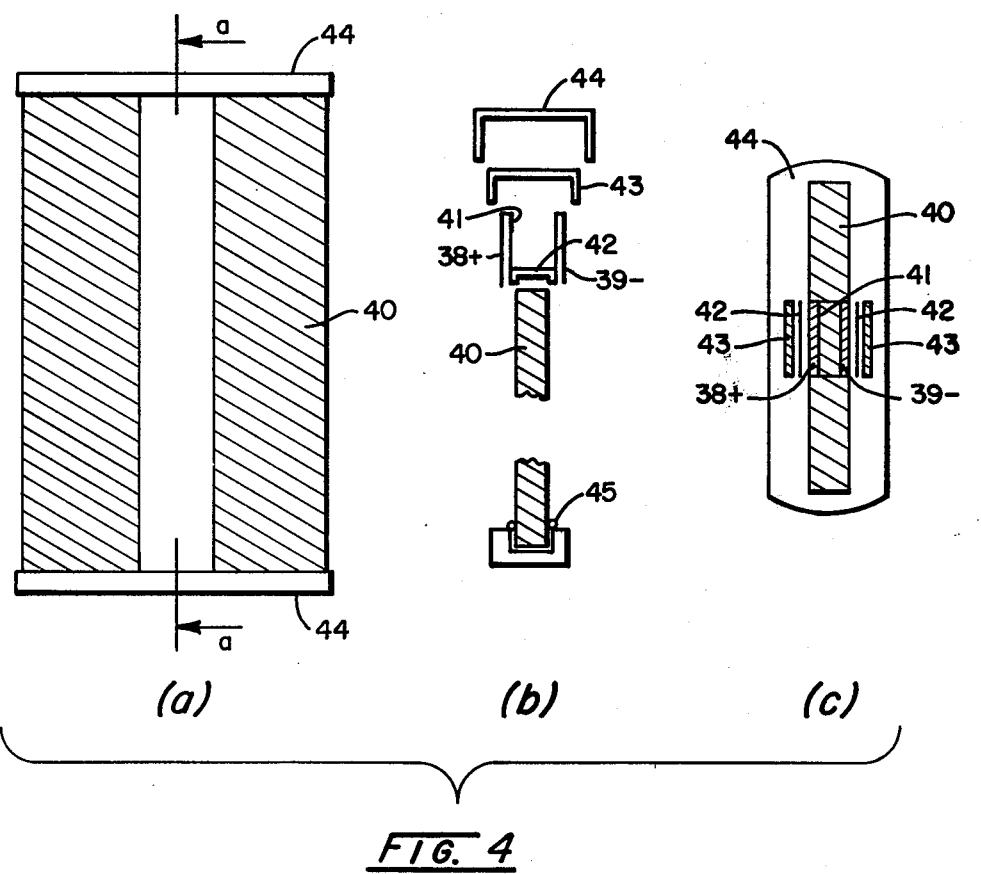

In this disclosure, the term "bipolar electrode" means, as originally defined in my copending application, an electrode structure which has both positive and negative surfaces during electrolysis and to which there are no direct electronic connections with the external power source. The term "bipolar connection" refers to the means by which electrons coming into the positive reaction face are transferred to the negative reaction face. The term "shield" means the "baffle extensions," 40, shown in FIG. 4 of my original application and its accompanying text and FIG. 4 of this specification. The term "hardness" refers to dissolved salts principally of calcium, magnesium, and iron compounds, usually hydrated oxides on the negative electrode.

In reducing my invention to practice I determined electrode spacings and bipolar connections could be made by cutting large, rolled, electrically noncunductive plastic sheets into strips about 0.2 to 0.4 inch wide. The cut edges of these strips were then grooved for their entire length with a width slightly less than the thickness of electrodes and shields and with a depth of about 0.1 inch. Electrodes and plastic shields were then pressed and sealed into these slots. Plastic cement then held the shields in the plastic slots and against the edges of each bipolar electrode. The smooth, rolled surfaces of the original plastic sheets were then stacked and cemented against each other. With this new and novel structure, electrical current is no longer required to go over the tops and bottoms of the electrodes but could pass straight through. This structure eliminated the need for an immersion coating of copper 41, inner conduction clip 42, outer conduction clip 43, and sealing caps 44 of the electrode of my prior application shown in FIG. 4. A very strong structure resulted from the cemented joints of plastic shields up and down and from the transverse plastic joints between the cemented, smooth rolled surfaces of the adjacent spacers. Simultaneously, the shields were retained in their desired position extending beyond each end of each bipolar electrode for a distance 10 times, or more, of the distance between opposing faces of adjacent electrodes. Under conditions satisfying Equations (1) and (2) of the original specifications for FIG. 5, water could be made to flow past each bipolar electrode in series and no problems with hardness deposits or electrode corrosions at top, bottom or ends were encountered. The bipolar connection problem was completely solved with this structure.

When this new structure of bipolar electrodes was used in the assembly 16 of FIG. 2, in which water flows by each bipolar electrode in parallel, hardness deposits did tend to build up and adhere to the negative coated or uncoated, titanium faces. Usually, these hardness deposits were nonuniform and where they accumulated more, the water slowed more, thereby accelerating accumulations of hardness deposits at that position. The gap between those adjacent electrodes soon plugged and only one or two electrodes would be completely ruined while the others appeared like new in the same assembly. A part of this invention was the discovery, contrary to expert opinions, that reversing the current at least once every two weeks, but not more than twice a day, on swimming pool waters of pH greater than 7.0 removed all hardness deposits. Secondly, there was no corrosion of electrodes at top, bottom, or ends with this new bipolar structure for periods up to 26 weeks.

A screening study of numerous sealing materials showed that "Scotch-Weld" brand structural adhesives 22/6B/A or 1838B/A were satisfactory for sealing the terminal electrodes through a plastic cover. The same adhesives, however, proved to be unsatisfactory for the sealing of the bottoms of extreme positive and negative electrodes. Here, at the bottom of assembled electrodes, the corrosion of terminal electrode bottoms was solved by cementing a thin plastic shield material over the entire bottom of the electrode assembly. Sheets of polyvinylchloride plastic down to 0.01 inch thick were also used for sealing these bottoms, but 1/32 inch thick sheeting material was satisfactory and generally less expensive. Thicker sheeting material was generally unsatisfactory because of its inherent rigidity.

Figures 5A, 5B:
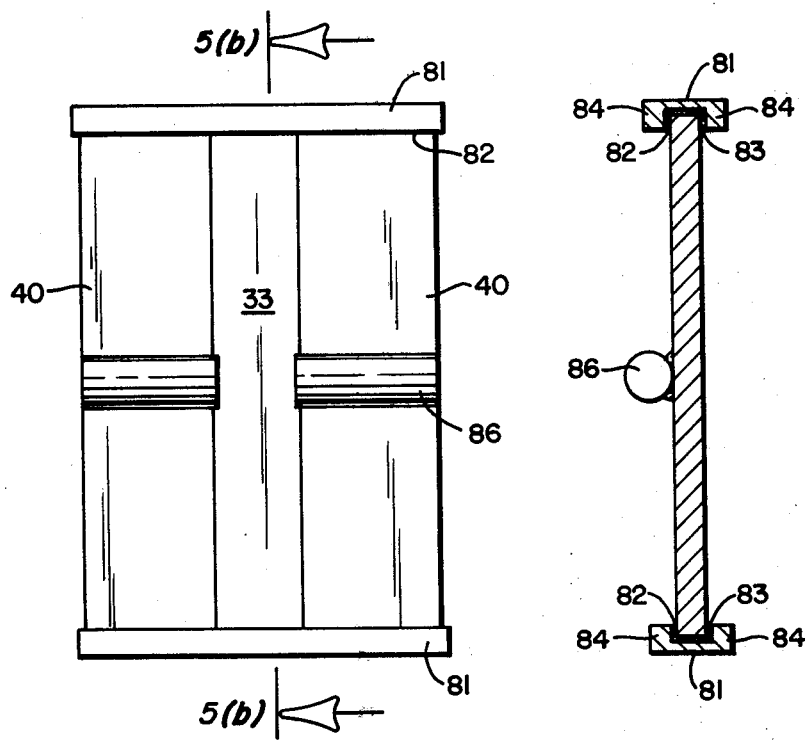
FIG. 5a is a front view of an individual bipolar electrode structure according to the invention described herein.
FIG. 5b is a side view of the bipolar electrode structure of this invention.

Referring to FIGS. 5a and 5b, each of the individual bipolar electrodes of this invention consists of two plastic electrode spacers 81 having grooves 82 into which are inserted one bipolar electrode 33 plus two plastic electrode shields 40 with a plastic solvent-type cement applied to both sides of each plastic-to-plastic joint and to one side of each plastic-to-metal joint. Bipolar electrodes 33 are made of commercial titanium sheet coated on both sides with platinum or another electrically conductive coating. When electrode shields 40 are two inches long or more, it has been found desirable to insert small shield supports 86 between each shield 40 to help stop movements of electrode shields 40 when fast moving water flows past them.

The electrode spacers 81 can be cut the same width from rolled plastic sheeting, usually about 0.2 to 0.4 inch wide. Grooves 82 are then cut into one of the cut edges of each spacer with a width 0.002 to 0.006 inch less than the thickness of the bipolar electrode 32. The length of each electrode spacer 81 is made equal to the width of each bipolar electrode 33 plus the width of the two shields. Grooves 82 are cut through the entire length of each spacer. The grooves 82 are cut through the entire length of each spacer. The grooves 82 are made 0.4 to 0.12 inch deep and are placed in the exact center of the thickness of each electrode spacer 81. While this combination of cuts was necessary to make these electrode spacer-from materials commercially available, it is now obvious molding or extrusion techniques could be used to make the same structures with the required precision.

Each bipolar electrode structure is assembled by forcing bipolar electrodes 33 into grooves 82 at the center of each spacer 81. Shields 40 are made from plastic sheeting having the same chemical composition as spacers 81 and having a thickness the same as, or slightly less than, the thickness of bipolar electrodes 33. These electrode shields are cut to the same length as the bipolar electrodes and their width is made at least 10 times the distance between adjacent electrodes. These electrode shields 40 are then slid into grooves 82 from each end and fastened to both electrode spacers 81 with a solvent-type cement 83. The same solvent-type cement 83 is also placed all around one side of the bipolar electrode 33 to close all joints, staying off of rolled sheet sides 84. At this point in the assembly procedure, when required, shield supports 86 are cemented to one side of each shield extending a small distance over each electrode. I have found that cut pieces of PVC welding rods are sometimes a most convenient source for these shield supports 86.

Figure 6:
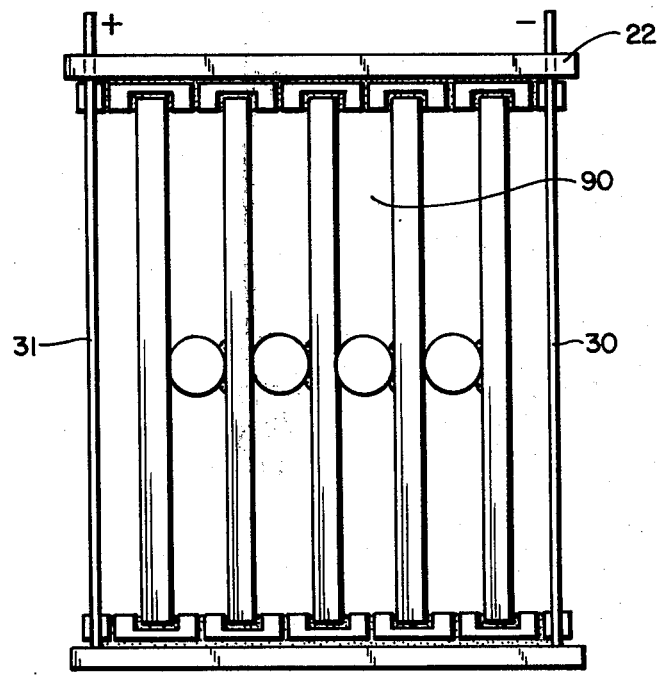
FIG. 6 is a front view of removable cover 22 with the attached electrode assembly of this invention.

For construction of electrode assembly 90 in FIG. 6, a number of assembled bipolar electrodes, such as shown in FIG. 5, are cemented to each other, rolled sheet side 84 against rolled sheet side 84, etc., until the required number of electrodes, as determined by the teaching of my copending application, are cemented together. The final electrode assembly, illustated by FIG. 6 is first smoothed on the top, bottom, and ends with a saw or planner and is then cemented to extreme positive and negative electrodes 30 and 31, which are pieces of titanium sheet coated on one side only. A more detailed description of electrodes 30 and 31 appears in my copending application. A suitable, flexible sealant is then applied between the electrode assembly 16 and cover 22 for insertion into cell 20, as shown in FIG. 2.

For concentrated brines, with 1/32 inch thick electrodes, an electrode spacer thickness of 3/16 inch is preferred but 0.25 inch or 0.125 inch thicknesses are also satisfactory. Smaller thicknesses are more apt to become plugged with extraneous materials; larger thicknesses increase resistive losses without commensurate benefits. For very dilute brines, such as the 0.3 weight percent salt recommended for swimming pools, and with 1/32 inch thick electrodes, an electrode spacer thickness of ⅛ inch is preferred but 3/32 inch or 3/16 inch thickness could also be used for spacers 81. The thinner spacers decrease overall resistance and increase the energy efficiency but are more apt to clog with extraneous materials in the passing liquids. By stacking electrodes this way I achieve a uniformity of precise alighments not possible heretofore with known procedures or materials. The bipolar electrode connection problem is thereby solved.

I also discovered, contrary to or beyond expert opinions, that, if I made the bipolar electrodes of titanium sheets coated with platinum or other conductive coatings on both sides of each bipolar electrode, I could reverse the current once or twice a day, thereby removing adherent hardness deposits which were not washed through by the moving electrolyte and achieving a long and useful life for the electrode assembly 16. If I did not reverse the current once or twice a day, I found the electrode assembly 16 might self-destruct in 15 to 60 days, depending on hardness content and fluid velocities through the electrode assembly. While it may now be obvious that this current reversal can be automated with a timer or photoelectric cell and an appropriate double pole, double throw relay, it was not obvious prior to my discovery how such frequent reversals would, or would not, unduely accelerate the destruction of the coated titanium electrodes.

For sealing of extreme, external electrode connections, it was found necessary to use a sealant that was not only elastic and flexible but which had a strong adherence to both the coated titanium tabs and to the surrounding plastic cover and spacers. In addition, this sealant must be fluid enough during assembly to flow into all recesses and crevices in the vicinity of the tabs and, when set, it must be resistive to oxidation or attack by water. "Scotch-Weld" brand structural adhesives Nos. 2216B/A and 1838B/A were found to have this unique combination of properties.

While these two adhesives were difficult to pull away from the titanium or the PVC plastic to which they had been applied, they exhibited what is known as a relatively poor "peeling strength." Moreover, they tended to soften somewhat with extensive exposure to solutions containing the freshly made bleach. Consequently, these structural adhesive, and other adhesives, were found to be unsatisfactory for sealing the bottoms of electrode assembly 16, because they would tend to peel back at edges when water flowed past them at high velocities. This bottom sealing problem was solved by cementing sealing sheet 89, made of the 1/32 inch thick, or thicker, plastic shield material at the bottom of electrode assembly 16 using undiluted, or diluted, commercially available plastic cements.

EXAMPLE I

One-thirty-second inch thick titanium was plated on both sides with 50 microinch of platinum by Englehard Industries of Union, N.J. This material was cut into pieces 2 inches by 2 inches for the double-coated, bipolar electrodes. One-eighth inch thick PVC, Type 1, gray plastic sheet, purchased from DeFabCo, Incorporated, Columbus, Ohio, was cut into 0.25 inch wide strips. These strips were then cut into 6 inch long pieces for the electrode spacers. Two, 1.5 inch O.D., 0.015 inch thick "Gyros" brand circular saw blades were mounted together on one spindle and placed in the arbor of a 23,000 rpm router. A horizontal guide was mounted under the "Gyros" saw blades so that by adjusting this horizontal guide with simultaneous adjustments of the arbor protrusion, grooves about 0.030 inch thick were cut exactly in the center of one cut edge of each electrode spacer. The Platinum coated bipolar electrodes were then forced into these grooves. Shields were made from 1/32 inch thick PVC, Type 1, gray plastic sheet purchased from the Plastic Piping Systems Company, Cleveland, Ohio. They were cut into sections one inch wide by two inches long. Next pieces of 3/32 inch O.D. PVC welding rod were cut into lengths about one inch for the spacers 86 in FIG. 5, and fastened thereto with diluted PVC cement. These shields with their attached supports on one side were slid into the electrode spacer grooves against each side of the bipolar electrodes. They were cemented in that position with "VC-2 Vinyl Cement," manufactued by Schwartz Chemical Co., 50-01 Second St., L.I.C., N.Y. This cement has been diluted about 1:1 with "Purple Primer," manufactured by Celanese piping Systems, Inc., Lexington, Ky. The same diluted cement was fed with an eye dropper around the entire periphery of one side of one side of the bipolar electrode. Nine bipolar electrodes were made this way and these nine were cemented together with the smooth, rolled sides of each electrode spacer against one another. After about 20 minutes of drying time for the diluted cement, the exposed cut edges of the spacers were passed through a table-bench saw to make a uniform, smooth surface above and below the assembled bipolar electrodes. End electrodes were then made with shields and protruding tabs on titanium electrodes with the 50 microinch platinum coating on one side only, as described in my copending application. These end electrodes were cemented to the previously cemented group of nine bipolar electrodes with additional 1/32 inch thich by 0.2 inch wide by 6 inches long spacers at top and bottom of the assembly. One-sixteenth by 5/16 inch holes in the cover for the extreme electrode tabs, were made in a drill press fitted with a 1/16 inch router bit. Structural adhesive 3M No. 2216B/A was spread all over the top of the spacers and end electrodes just prior to placing the cover over the tabs. Excess adhesive at edges was wiped away and some of it was placed over the cover around the protruding tabs. After 24 hours of set-up time for the adhesive, the electrode assembly with its cover was welded into a preassembled cell. Integral tabs on ancilliary grounding electrodes were also sealed through the plastic plumbing with structural adhesive No. 2216B/A.

Using a control unit descried in my copending application and with a manual, double pole, double throw switch to reverse the direction of current flow about once-a-day, this unit operated satisfactorily on a 13,600 gallon pool for 53 days with no perceptable loss of performance for making the desired chlorine. At this time, this unit was taken off line for examination. There were no hardness deposits between electrodes nor on the grounding electrodes. All internal parts seemed almost new. After winter storage, the unit was again put on line and continued to operate satisfactorily for another consecutive 182 days using a manual reversal of current every 12 to 48 hours, thereby indicating the bipolar electrode connection problems, the electrode sealing problem, the bottom sealing problem, and the current reversal problem had all been solved.

I claim:
1. A bipolar electrode comprising:
   (a) first and second generally longitudinal members, each made of an electronically nonconductive material and each having a longitudinal groove therein adapted to receive and retain the edge of a sheet of material inserted therein;
   (b) an essentially flat rectangular sheet of titanium, having a top edge and a bottom edge, and having a coating of platinum metal or other conductive coating deposited on the opposing faces thereof the top edge of said sheet being retained in the longitudinal groove of said first member intermediate to the ends thereof and the bottom edge of said sheet; and
   (c) a pair of essentially flat rectangular sheets of an electrically nonconductive material of substantially the same thickness as said flat sheet of platinum- or conductive-coated-titanium, each having a top edge and a bottom edge, one sheet positioned on each end of, coplanearly with, and contiguous with said said sheet of titanium, each with its top edge retained in the longitudinal groove in said first member and its bottom edge retained in in the groove in said second member.
2. An electrode assembly comprising a plurality of the bipolar electrodes of claim 1 wherein:
   (a) the titanium sheets are positioned in parallel relationship;
   (b) the first longitudinal members thereof are rigidly attached to each other;
   (c) the second longitudinal members thereof are rigidly attached to each other;
   (d) the end electrodes are adapted to be connected to positive and negative terminals in a direct current electrical circuit; and
   (e) said assembly is adapted to being inserted into a cell through which an aqueous brine solution is flowed.

3. The electrode assembly of claim 1 wherein the flat sheets of electrically nonconductive material are made of plastic.

4. The assembly of claim 3 wherein the plastic is polyvinyl chloride.

5. The electrode assembly of claim 2 wherein said second longitudinal members are solvent welded to a single sheet of electrically nonconductive material.

6. The electrode assembly of claim 2 wherein said conductive coated titanium sheets are sealed into said first and said second longitudinal members by a sealant material.

7. The assembly of claim 2 wherein the adjacent edges of said flat titanium sheets and flat sheets of electrically nonconductive material are sealed by a liquid plastic cement.

8. The assembly of claim 2 wherein the direction of current is reversed not more than twice a day nor less than once every two weeks.

9. The assembly of claim 2 wherein the sheets of nonconductive material have attached to one surface thereof electrically nonconductive spacers of a thickness corresponding to approximately the distance between neighboring electrode surfaces.

10. The assembly of claim 2 wherein said end electrodes are sealed into said assembly by a two-part epoxy adhesive which is capable of simultaneously adhering to titanium and to plastic, which remains solid but flexible and elastic under temperature variations, which is fluid during assembly of component parts, and which is resistant to water and oxidation.

* * * * *